(12) United States Patent
Kretz et al.

(10) Patent No.: US 8,838,478 B2
(45) Date of Patent: Sep. 16, 2014

(54) TARGETED ADVERTISING IN MOBILE DEVICES

(75) Inventors: Martin Kretz, Lund (SE); Rudolf George Tom Gajdos, Dalby (SE)

(73) Assignees: Sony Corporation, Tokyo (JP); Sony Mobile Communications AB, Lund (SE)

( * ) Notice: Subject to any disclaimer, the term of this patent is extended or adjusted under 35 U.S.C. 154(b) by 1755 days.

(21) Appl. No.: 11/760,178

(22) Filed: Jun. 8, 2007

(65) Prior Publication Data

US 2008/0281694 A1 Nov. 13, 2008

Related U.S. Application Data

(60) Provisional application No. 60/917,343, filed on May 11, 2007.

(51) Int. Cl.
*G06Q 30/02* (2012.01)

(52) U.S. Cl.
CPC ............ *G06Q 30/02* (2013.01); *G06Q 30/0267* (2013.01)
USPC ...................................... 705/14.64

(58) Field of Classification Search
CPC ........................... G06Q 30/02; G06Q 30/0267
USPC .......... 705/14, 14.64; 455/456, 414; 342/357; 375/202
See application file for complete search history.

(56) References Cited

U.S. PATENT DOCUMENTS

| | | | | |
|---|---|---|---|---|
| 6,580,916 | B1 * | 6/2003 | Weisshaar et al. | 455/456.1 |
| 6,606,502 | B1 * | 8/2003 | Chung Kam Chung et al. | 455/466 |
| 7,143,091 | B2 * | 11/2006 | Charnock et al. | 707/5 |
| 7,239,871 | B2 * | 7/2007 | Shamp et al. | 455/422.1 |
| 7,519,589 | B2 * | 4/2009 | Charnock et al. | 707/5 |
| 2002/0120516 | A1 * | 8/2002 | Sakagami et al. | 705/14 |
| 2003/0101451 | A1 * | 5/2003 | Bentolila et al. | 725/34 |
| 2003/0144873 | A1 * | 7/2003 | Keshel | 705/1 |
| 2004/0148228 | A1 * | 7/2004 | Kwei | 705/26 |
| 2004/0243422 | A1 * | 12/2004 | Weber et al. | 705/1 |
| 2005/0096084 | A1 * | 5/2005 | Pohja et al. | 455/556.1 |
| 2006/0178215 | A1 * | 8/2006 | Lehikoinen et al. | 463/39 |
| 2006/0178932 | A1 * | 8/2006 | Lang | 705/14 |
| 2006/0265508 | A1 * | 11/2006 | Angel et al. | 709/230 |
| 2008/0057915 | A1 * | 3/2008 | Lahtiranta et al. | 455/414.1 |

* cited by examiner

*Primary Examiner* — John G Weiss
*Assistant Examiner* — Adam Chornesky
(74) *Attorney, Agent, or Firm* — Snyder, Clark, Lesch & Chung, LLP

(57) ABSTRACT

A system may identify selected device users of multiple device users as members of a virtual group. The system may identify attributes, characteristics or actions that a sub-set of members of the virtual group may have in common that may be related to goods and/or services for sale. The system may send advertisements related to the goods or services to devices associated with other members of the group not included in the sub-set of members.

26 Claims, 12 Drawing Sheets

TARGETED ADVERTISING IN MOBILE DEVICES

CROSS REFERENCE TO RELATED APPLICATION

The instant application claims priority from provisional application No. 60/917,343, filed May 11, 2007, the disclosure of which is incorporated by reference herein in its entirety.

TECHNICAL FIELD OF THE INVENTION

Implementations described herein relate generally to advertising and, more particularly, to targeted advertising in mobile devices.

BACKGROUND

The value of advertising for promoting the sale of products and/or services has long been recognized. Advertisements of products and/or services can be found in many different venues and contexts. As a few examples, advertising is widespread on radio programs, television programs, in books and/or magazines, and on road-side billboards.

Mobile devices, such as, for example, cellular radiotelephones, have increasingly become a common consumer electronic item used by a significant number of people. Such mobile devices, thus, represent a substantial source of advertising revenue if advertisements could be provided to the device users by, for example, a mobile network provider. Advertisements provided to mobile device users, however, can interfere with the users' use and enjoyment of their mobile devices. For example, advertisements that are not targeted to an individual user may greatly annoy that user when presented at the user's mobile device.

SUMMARY

According to one aspect, a method may include identifying selected device users of a plurality of device users as members of a virtual group. The method may further include identifying attributes, characteristics or actions that a sub-set of members of the virtual group may have in common that may be related to goods and/or services for sale. The method may also include sending advertisements related to the goods or services to devices associated with other members of the group not included in the sub-set of members.

Additionally, the users may use mobile devices.

Additionally, the actions may include a common purchase made by the sub-set of members of the virtual group.

Additionally, identifying the selected device users as members of the virtual group may include obtaining an email list from an email address book stored at a device associated with one of the selected device users and identifying the selected device users as members of the virtual group based on the email list.

Additionally, identifying the selected device users as members of the virtual group may include identifying an email being sent between a first one of the plurality of device users and other ones of the plurality of device users and identifying the selected device users based on the email.

Additionally, identifying the selected device users as members of the virtual group may include identifying an instant message being sent between a first one of the plurality of device users and other ones of the plurality of device users and identifying the selected device users based on the instant message.

Additionally, identifying the selected device users as members of the virtual group may include identifying when a first device associated with a first one of the plurality of device users is located within a same geographic vicinity as second devices associated with one or more other ones of the plurality of device users and identifying the selected device users based on the first device being located within a same geographic vicinity as the second devices.

Additionally, identifying the selected device users as members of the virtual group may include identifying a short messaging service (SMS) message or a multimedia messaging service (MMS) message being sent between a first one of the plurality of device users and one or more other ones of the plurality of device users and identifying the selected device users based on the message.

Additionally, identifying the selected device users as members of the virtual group may include identifying a call being placed between a first one of the plurality of device users and one or more second ones of the plurality of device users and identifying the selected mobile device users based on the call.

Additionally, identifying the selected device users as members of the virtual group may include identifying a first one of the selected device users using a network chat service to communicate with one or more second ones of the selected device users and identifying the selected devices based on the use of the network chat service.

Additionally, the attributes, characteristics or actions that the sub-set of members have in common may include at least one of purchasing a same product or service, downloading a same music or video, sharing files among one or more of the sub-set of members, rating a same music or video highly, donating money to a same benefit, having a similar browser history (e.g., similar history of visited web pages), having a similar television show or channel watching history, being in a same geographic location, traversing a same geographic area, shopping in a same store, driving a same route, being a same age, being a same gender, being in a same or similar income group or being related to one another by family.

According to a further aspect, a method may include selecting first mobile device users as targets of advertisements based on the actions of a second mobile device user, where the second mobile device user is different than the first mobile device users and wherein the actions of the second mobile device user include bringing a mobile device associated with the second mobile device user to a same geographic location as the mobile devices associated with the first mobile device users within a given time period or placing one or more calls to the mobile devices associated with the first mobile device users. The method may further include sending advertisements to mobile devices associated with the first mobile device users.

Additionally, a server may send the advertisements to the mobile devices associated with the first mobile device users via a network.

Additionally, the actions of the second mobile device user may further include sending one or more emails to the first mobile device users.

Additionally, the actions of the second mobile device user may further include sending one or more instant messages to the first mobile device users.

Additionally, the actions of the second mobile device user may further include sending short messaging service (SMS) messages or multimedia messaging service (MMS) messages.

Additionally, the actions of the second mobile device user may further include using a network chat service to communicate with one or more of the second mobile device users.

Additionally, the advertisements may include visual advertisements and the mobile devices associated with the first mobile device users may display the visual advertisements.

Additionally, the advertisements may include audio advertisements and the mobile devices associated with the first mobile device users may audibly present the audio advertisements.

According to another aspect, a system may include an interface configured to receive data related to actions of a plurality of mobile device users. The system may further include a processing unit configured to: identify selected mobile device users of the plurality of mobile device users as members of a virtual group based on the actions, identify attributes, characteristics or actions that a sub-set of members of the virtual group may have in common that may be related to goods and/or services for sale. The interface may further be configured to send advertisements related to the goods or services to mobile devices associated with other members of the group not included in the sub-set of members.

Additionally, the actions may include sending one or more emails between one or more of the plurality of mobile device users.

Additionally, the actions include sending one or more instant messages between one or more of the plurality of mobile device users.

Additionally, the actions may include bringing a mobile device associated with one of the plurality of mobile device users to a same geographic location as one or more mobile devices associated with other ones of the plurality of mobile device users within a given time period.

Additionally, the actions may include sending short messaging service (SMS) messages or multimedia messaging service (MMS) messages between one or more of the plurality of mobile device users.

Additionally, the actions user may include placing one or more calls between one or more of the plurality of mobile device users.

Additionally, the actions may include using a network chat service to communicate between one or more of the plurality of mobile device users.

According to an additional aspect, a system may include means for identifying selected device users of a plurality of device users as members of a virtual group. The system may further include means for identifying attributes, characteristics or actions that a sub-set of members of the virtual group may have in common that may be related to goods and/or services for sale and means for sending advertisements related to the goods or services to devices associated with other members of the group not included in the sub-set of members.

It should be emphasized that the term "comprises/comprising" when used in this specification is taken to specify the presence of stated features, integers, steps, components or groups but does not preclude the presence or addition of one or more other features, integers, steps, components or groups thereof.

BRIEF DESCRIPTION OF THE DRAWINGS

The accompanying drawings, which are incorporated in and constitute a part of this specification, illustrate one or more embodiments of the invention and, together with the description, explain the invention. In the drawings.

DETAILED DESCRIPTION OF EMBODIMENTS

The following detailed description of the invention refers to the accompanying drawings. The same reference numbers in different drawings may identify the same or similar elements. Also, the following detailed description does not limit the invention.

Exemplary embodiments enable the targeting of advertisements to mobile device users by defining "virtual" groups of mobile device users that have interacted with one another in some form or fashion. Interactions between mobile device users that may be used as a basis for defining members of these virtual groups may include, for example, emails sent between mobile device users, short messaging service (SMS) or multimedia message service (MMS) messages sent between mobile device users, calls that are placed between mobile device users, or in-person meetings that occur between mobile device users. A sub-set of members of the defined virtual group may then be identified that have some characteristic, attribute or action in common that may be related to goods and/or services for sale. For example, two members of a virtual group that have rented a same DVD may be identified. Advertisements of goods and/or services related to the characteristic, attribute or action that the sub-set of members has in common may then be provided to other members of the virtual group as targeted advertising. As an example, if three out of ten members of a virtual group have purchased a digital camera, then there is a good chance that the other seven members of the virtual group may also be interested in the digital camera. Providing targeted advertising for the digital camera to those seven members may be more successful than advertising provided to mobile device users not in the virtual group.

Figure 1:
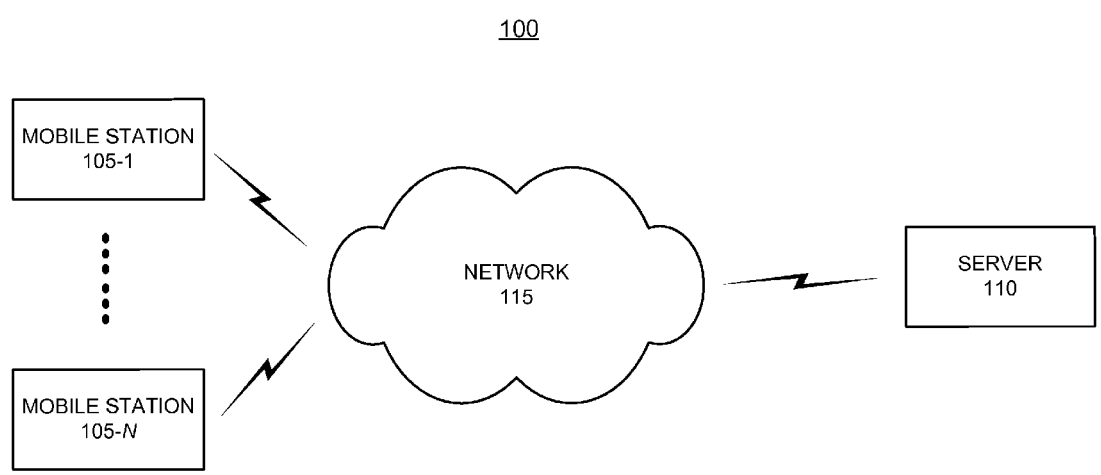
FIG. 1 illustrates an exemplary system in which exemplary embodiments may be implemented.

FIG. 1 illustrates an exemplary system 100 in which exemplary embodiments may be implemented. System 100 may include multiple mobile stations 105-1 through 105-N (collectively referred to herein as "mobile stations 105") connected with a server 110 via a network 115 using wired or wireless links. Network 115 may include one or more networks of any type, including a local area network (LAN), a wide area network (WAN), a metropolitan area network (MAN), a telephone network, such as the Public Switched Telephone Network (PSTN) or a Public Land Mobile Network (PLMN), an intranet, the Internet or a combination of networks. The PLMN(s) may further include a packet-switched sub-network, such as, for example, General Packet Radio Service (GPRS), Cellular Digital Packet Data (CDPD), or Mobile IP sub-network.

Mobile stations 105-1 through 105-N may include a telephone, cellular radiotelephone, Personal Communications System (PCS) terminal or the like. A PCS terminal may combine a cellular radiotelephone with data processing, facsimile and data communications capabilities. Mobile stations 105-1 through 105-N may further include a personal digital assistant (PDA), a conventional laptop and/or palmtop receiver, or another appliance that includes a radiotelephone transceiver, or the like. A PDA may include a radiotelephone, a pager, Internet/intranet access, a web browser, an organizer, calendars and/or a global positioning system (GPS) receiver. One or more of mobile stations 105-1 through 105-N may further be referred to as a "pervasive computing" device.

Server 110 may include a server entity that may obtain information regarding the individual users using each of mobile stations 105-1 through 105-N and may provide targeted advertisements for goods and/or services to respective ones of mobile stations 105-1 through 105-N. In some implementations, server 110 may collect user information related to use of each of mobile stations 105-1 through 105-N, analyze the information to determine members of one or more "virtual" groups, and target advertisements to respective members of these virtual groups.

Figure 2:
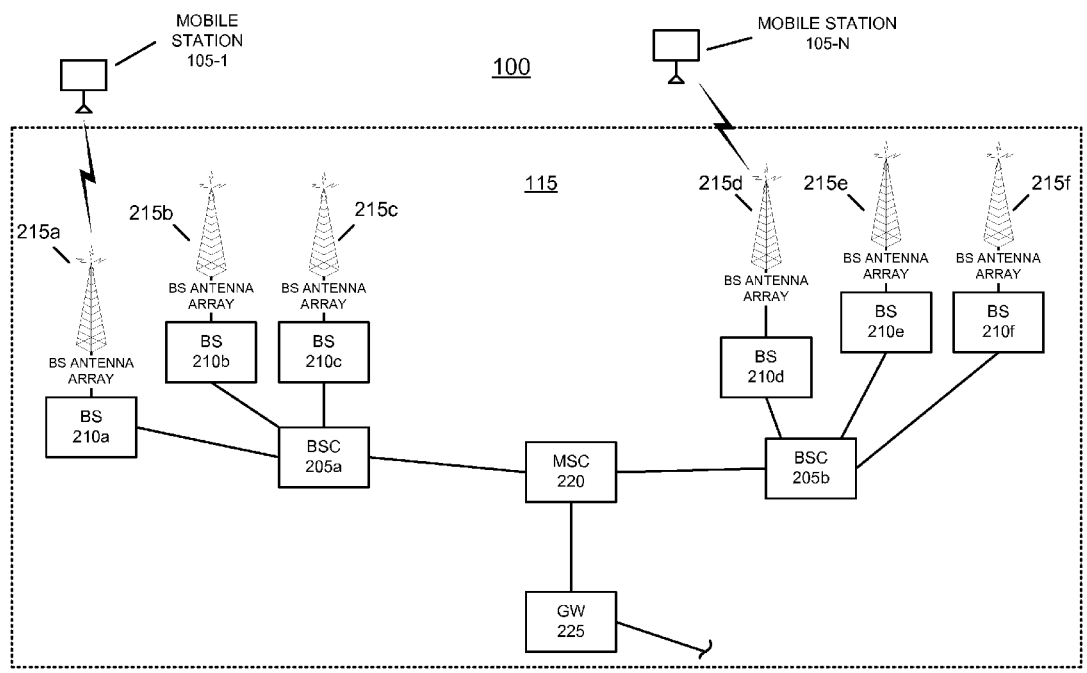
FIG. 2 illustrates an exemplary embodiment in which the system of FIG. 1 includes a public land mobile network.

FIG. 2 illustrates one example of system 100 implemented using a cellular network. System 100 may include mobile station 105-1 and mobile station 105-N and a PLMN 115. PLMN 115 may include one or more base station controllers (BSCs) 205a-205b, multiple base stations (BSs) 210a-210f, multiple base station antenna arrays 215a-215f, one or more mobile switching centers (MSCs), such as MSC 220, and one or more gateways (GWs), such as GW 225.

PLMN 115 may include components used for transmitting data to and from mobile stations 105-1 and 105-N. Such components may include base station antenna arrays 215a-215f, which transmit and receive, via appropriate data channels, data from mobile stations within their vicinity. Base stations 210a-210f connect to their respective antenna arrays 215a-215f, and format the data transmitted to, or received from the antenna arrays 215a-215f in accordance with existing techniques, for communicating with BSCs 205a-205b or a mobile station, such as mobile stations 105-1 or 105-N. Among other functions, BSCs 205a-205b may route received data to either MSC 220 or a base station (e.g., BSs 210a-210c or 210d-210f). MSC 220 routes received data to BSC 205a or 205b. GW 225 may route data received from an external domain (not shown) to an appropriate MSC (such as MSC 220), or from an MSC to an appropriate external domain. Server 110 (not shown in FIG. 2) may connect to PLMN 115 via MSC 220 or via another network (e.g., the Internet) connected to GW 225.

Figure 3:
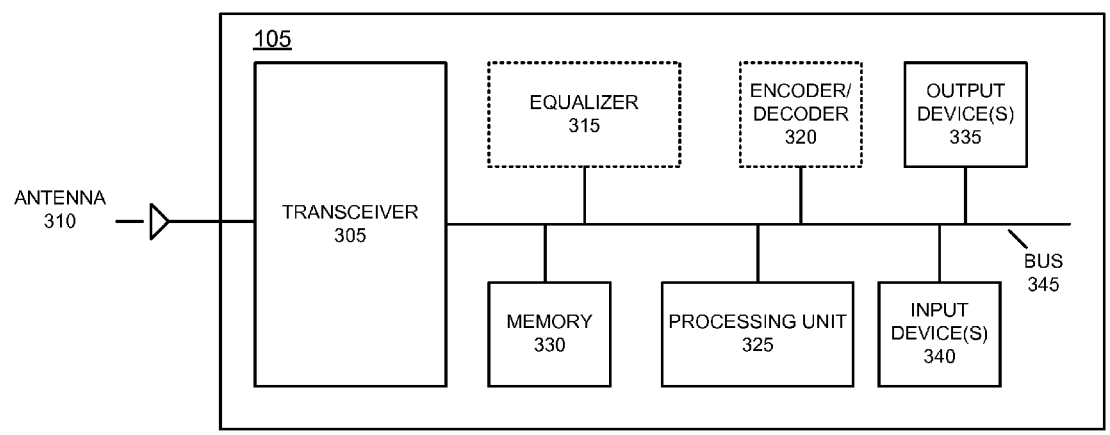
FIG. 3 illustrates a mobile station according to an exemplary embodiment.

FIG. 3 illustrates a mobile station 105 consistent with an exemplary embodiment. Mobile station 105 may include a transceiver 305, an antenna 310, an optional equalizer 315, an optional encoder/decoder 320, a processing unit 325, a memory 330, an output device(s) 335, an input device(s) 340, and a bus 345.

Transceiver 305 may include transceiver circuitry for transmitting and/or receiving symbol sequences in a network, such as network 115, via antenna 310. Transceiver 305 may include, for example, a conventional RAKE receiver. Transceiver 305 may further include mechanisms for estimating the signal-to-interference ratio (SIR) of received symbol sequences. Transceiver 305 may additionally include mechanisms for estimating the propagation channel Doppler frequency.

Equalizer 315 may store and implement Viterbi trellises for estimating received symbol sequences using, for example, a maximum likelihood sequence estimation technique. Equalizer 315 may additionally include mechanisms for performing channel estimation. Encoder/decoder 320 may include circuitry for decoding and/or encoding received or transmitted symbol sequences.

Processing unit 325 may perform all data processing functions for inputting, outputting, and processing of data including data buffering and device control functions, such as call processing control, user interface control, or the like. Processing unit 325 may include a processor, microprocessor, or processing logic that may interpret and execute instructions. Memory 330 provides permanent, semi-permanent, or temporary working storage of data and instructions for use by processing unit 325 in performing processing functions. Memory 330 may include large-capacity storage devices, such as a magnetic and/or optical recording medium and its corresponding drive. Output device(s) 335 may include mechanisms for outputting data in video, audio, and/or hard copy format. Input device(s) 340 permit entry of data into mobile station 105 and may include a user interface and a microphone (not shown). The microphone can include mechanisms for converting auditory input into electrical signals. Bus 345 interconnects the various components of mobile station 105 to permit the components to communicate with one another. The configuration of components of mobile station 105 illustrated in FIG. 3 is for illustrative purposes only. One skilled in the art will recognize that other configurations may be implemented.

Figure 4:
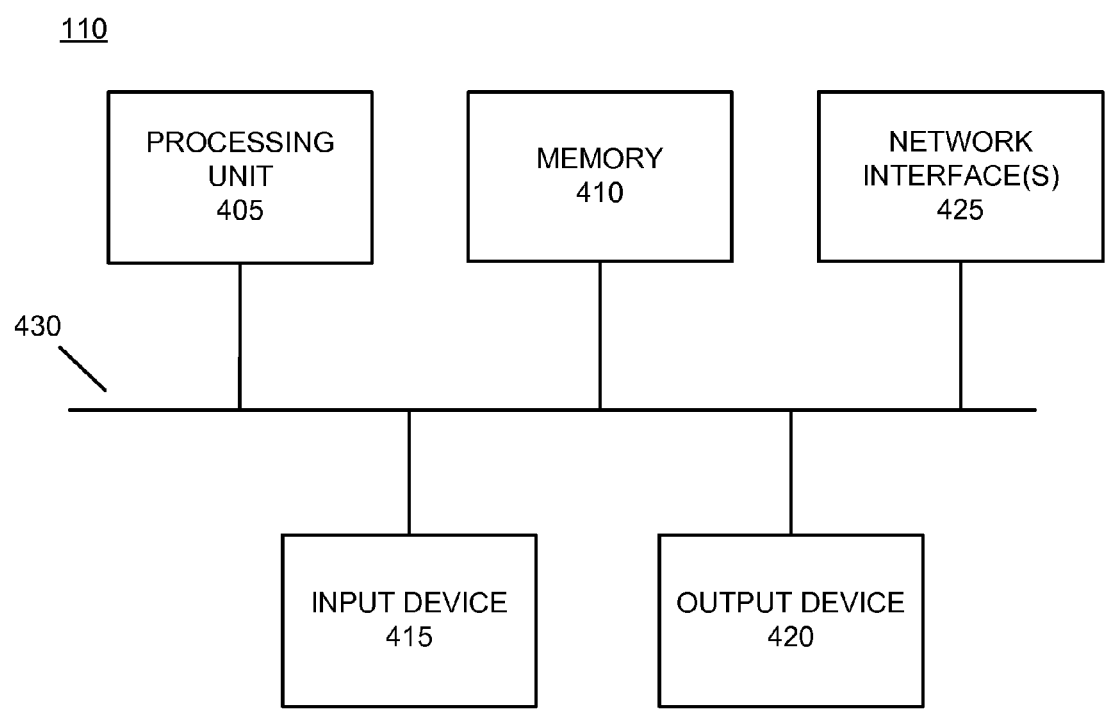
FIG. 4 illustrates a server according to an exemplary embodiment.

FIG. 4 illustrates server 110 consistent with an exemplary embodiment. Server 110 may include a processing unit 405, a memory 410, an input device 415, an output device 420, a network interface(s) 425 and a bus 430.

Processing unit 405 may perform all data processing functions for inputting, outputting, and processing of data. Processing unit 405 may include a processor, microprocessor, or processing logic that may interpret and execute instructions. Memory 410 may provide permanent, semi-permanent, or temporary working storage of data and instructions for use by processing unit 405 in performing processing functions. Memory 410 may include large-capacity storage devices, such as a magnetic and/or optical recording medium and its corresponding drive. Input device 415 may include a mechanism that permits an operator to provide information to server 110, such as a keyboard, a mouse, a pen, voice recognition and/or biometric mechanisms, etc. Output device 420 may include a mechanism that outputs information to the operator, including a display, a printer, a speaker, etc.

Network interface(s) 425 may include any transceiver-like mechanism that enables server 110 to communicate with other devices and/or systems. For example, network interface 425 may include mechanisms for communicating with another device or system via a network, such as network 115. Bus 430 may interconnect the various components of server 110 to permit the components to communicate with one another.

Server 110, consistent with exemplary implementations, may perform certain processes, as will be described in detail below. Server 110 may perform these processes in response to processing unit 405 executing software instructions contained in a computer-readable medium, such as memory 410. A computer-readable medium may be defined as a physical or logical memory device and/or a carrier wave.

The software instructions may be read into memory 410 from another computer-readable medium, or from another device via network interface 425. The software instructions contained in memory 410 may cause processing unit 410 to perform processes that will be described later. Alternatively, hardwired circuitry may be used in place of or in combination with software instructions to implement processes consistent with exemplary implementations. Thus, implementations are not limited to any specific combination of hardware circuitry and software.

The configuration of components of server 110 illustrated in FIG. 4 is for illustrative purposes only. One skilled in the art will recognize that other configurations may be implemented.

Figure 5:
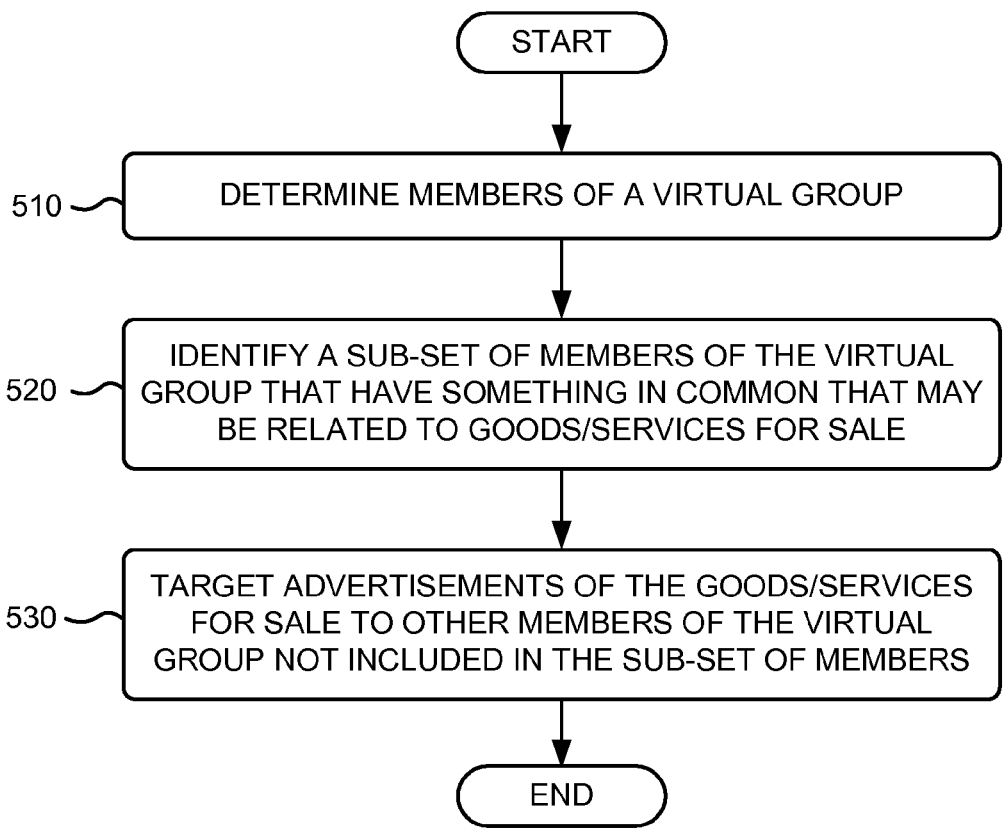
FIG. 5 is a flowchart of an exemplary process for targeting advertisements to members of a virtual group.

FIG. 5 is a flowchart of an exemplary process for targeting advertisements to mobile device users. In one implementation of the exemplary process of FIG. 5, mobile station 105 may perform blocks 510 and 520 and provide corresponding data to server 110 which, in turn, may target advertisements to mobile station 105 (and other mobile stations) based on the data. In another implementation of the exemplary process of FIG. 5, server 110 may obtain data from one or more mobile stations 105 and may perform blocks 510, 520 and 530 to target advertisements to the one or more mobile stations 105. In a further implementation of the exemplary process of FIG. 5, server 110 may perform blocks 510 and 520 and collect data with respect to multiple virtual groups. By collecting data with respect to multiple virtual groups and analyzing the aggregated data, advertisements may be more accurately targeted.

Figure 6:
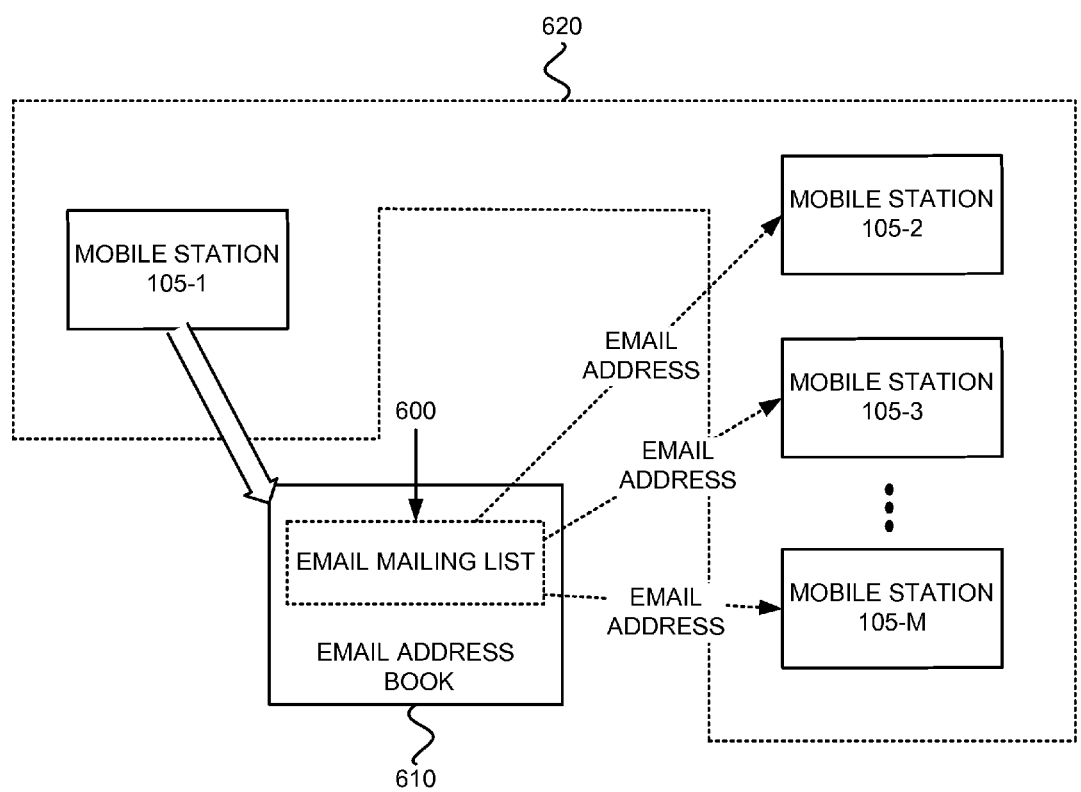
FIGS. 6-11 graphically illustrate exemplary techniques for determining a virtual group.

The exemplary process may begin with the determination of members of a virtual group (block 510). Members of a virtual group may be determined by analyzing interactions between one or more users associated with mobile stations 105-1 through 105-N. For example, as shown in FIG. 6, an email mailing list 600 from an email address book 610 may be obtained from mobile station 105-1 and the email addresses in the list may be extracted. Users associated with each email address may be determined to be members of the virtual group 620. As shown in FIG. 6, virtual group 620 includes mobile station 105-1, from which email mailing list 600 was obtained, and mobile stations 105-2 through 105-M that are associated with users that correspond to the email addresses extracted from email mailing list 600.

Figure 7:
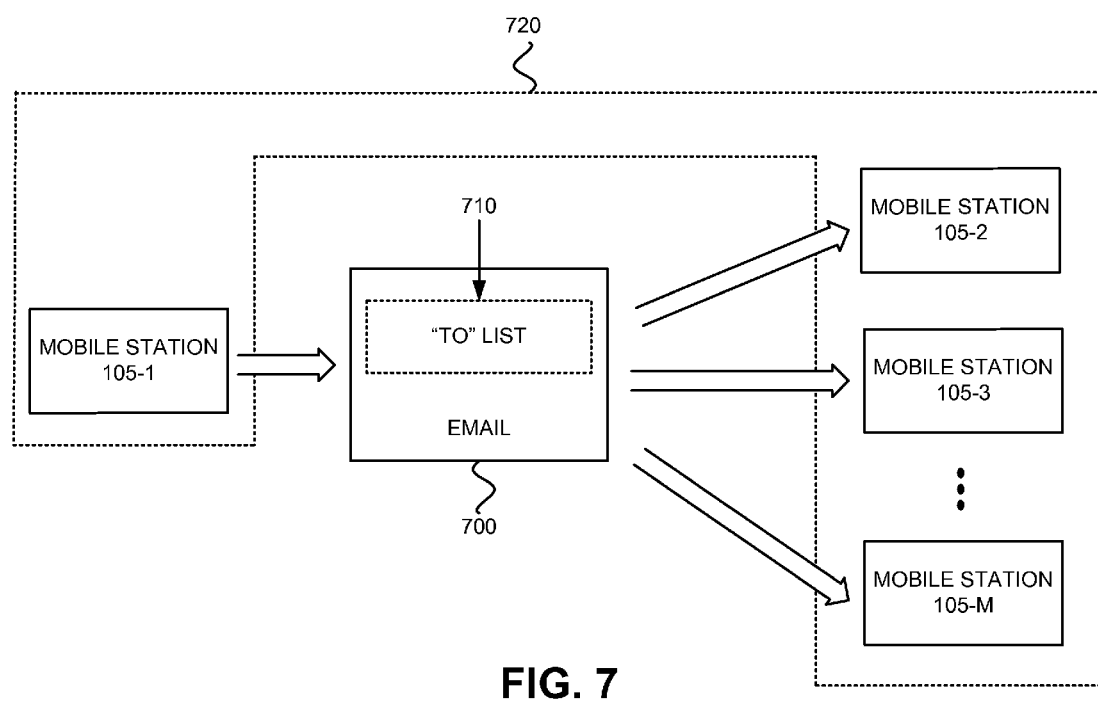

As another example, an email sent between users may be used to identify members of a virtual group. As shown in FIG. 7, a user at mobile station 105-1 may send an email 700 to multiple users associated with mobile stations 105-2 through 105-M. Email addresses of the multiple users may be extracted from email 700's "To" list 710, which designates the destination(s) of the email, to identify the multiple users to be included in virtual group 720. As shown in FIG. 7, virtual group 720 includes mobile station 105-1, from which email 700 was sent, and mobile stations 105-2 through 105-M that are associated with users to whom email 700 was sent. In another implementation, sections of an email sent between users, other than the "to" list, may be parsed to identify members of the virtual group. For example, the message content of the email may be parsed.

Figure 8:
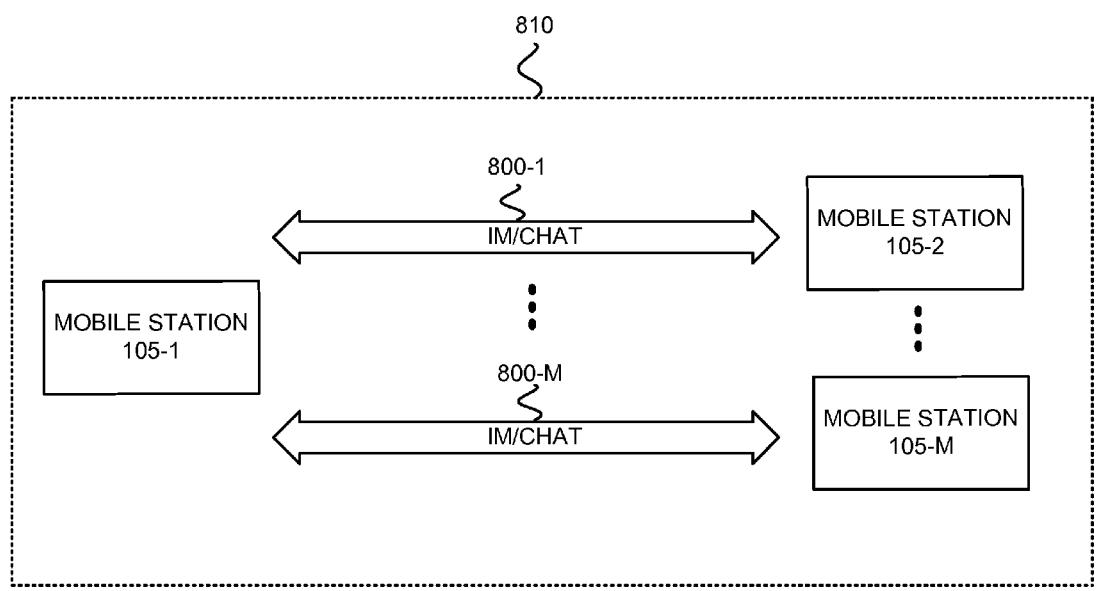

As a further example, instant messages or network chatting service messages may be used to identify members of a virtual group. As shown in FIG. 8, a user at mobile station 105-1 may engage in instant messaging or chatting 800-1 through 800-M with users associated with mobile stations 105-2 through 105-M. Each user involved in the instant messaging or chatting session may be identified as a member of virtual group 810. As shown in FIG. 8, virtual group 810 includes the users associated with mobile station 105-1 and mobile stations 105-2 through 105-M.

Figure 9:
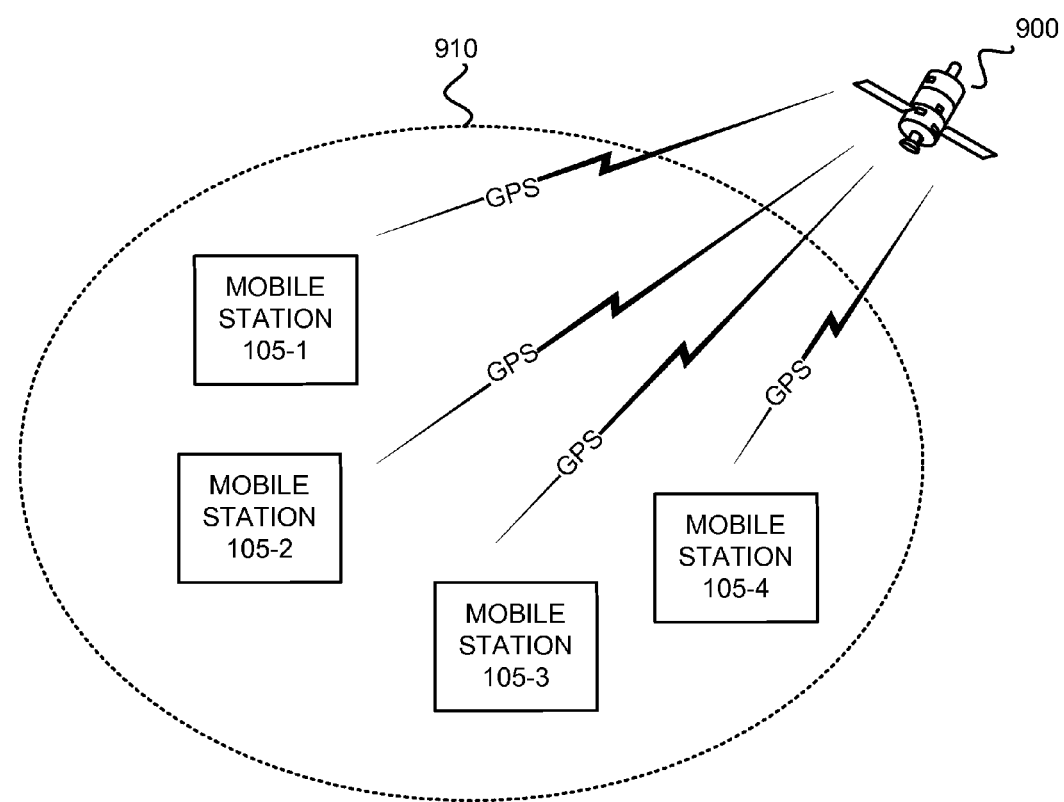

As another example, a close geographic proximity of multiple users may be used to identify members of a virtual group. As shown in FIG. 9, users associated with mobile stations 105-1 through 105-4 may be geographically located in the vicinity of one another during a time period (e.g., the users may have a face-to-face meeting). The location of mobile stations 105-1 through 105-4 may be determined using, for example, GPS signals received from a GPS satellite 900. Each user determined to be in the same geographic vicinity at a specific instant of time (or during a period of time) may be included in virtual group 910. As shown in FIG. 9, virtual group 910 includes the users associated with mobile stations 105-1 through 105-4. Other forms of location information may be used to determine mobile station location (e.g., a same network cell).

Figure 10:
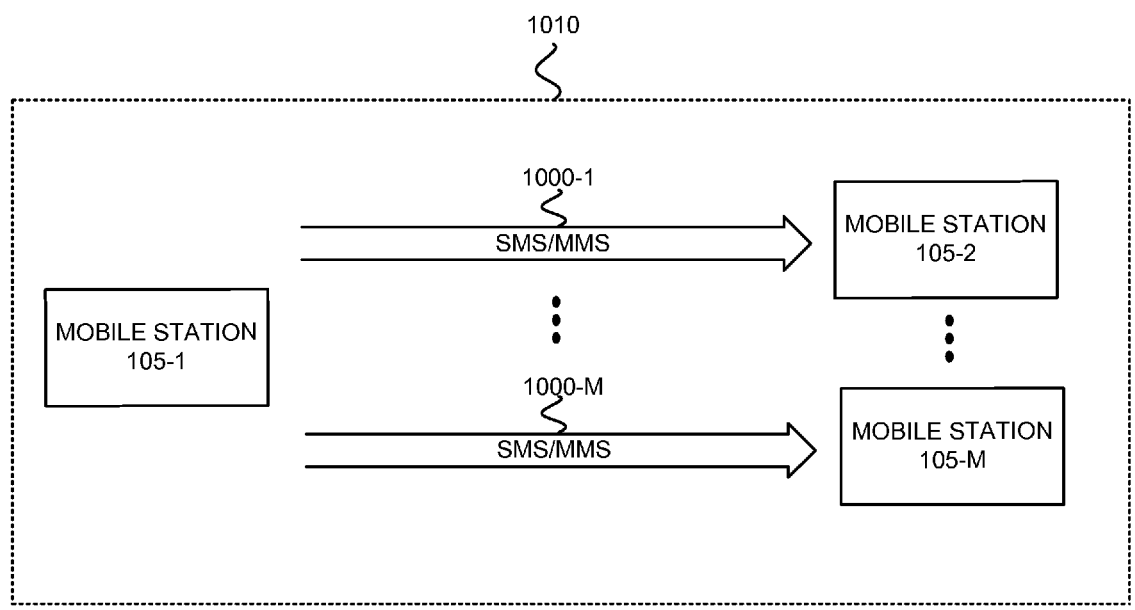

As an additional example, short messaging service (SMS) or multimedia message server (MMS) messages may be used to identify members of a virtual group. As shown in FIG. 10, a user at mobile station 105-1 may send SMS or MMS messages 1000-1 through 1000-M to mobile stations 105-2 through 105-M. The user that sent the SMS or MMS messages, and the users who received the messages, may be identified as a member of virtual group 1010. As shown in FIG. 10, virtual group 1010 includes the users associated with mobile stations 105-1 through 105-M.

Figure 11:
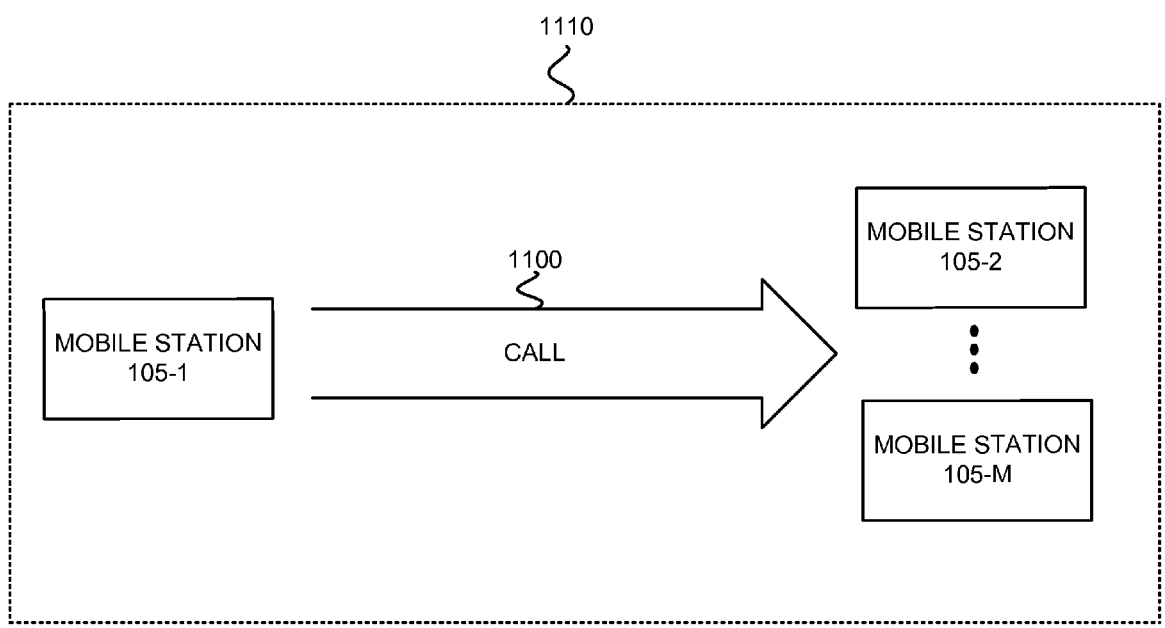

As yet another example, telephone calls may be used to identify members of a virtual group. As shown in FIG. 11, a user at mobile station 105-1 may place a telephone call 1100 (e.g., a conference call) to mobile stations 105-2 through 105-M. The user that placed the call, and the users who received the calls, may be identified as a member of virtual group 1110. As shown in FIG. 11, virtual group 1110 includes the users associated with mobile stations 105-1 through 105-M.

As further examples, individuals identified in appointments noted in a calendar application (e.g., Outlook) may be identified as members of a virtual group; file sharing (e.g., photo, video clip, etc.) among individuals may be used to identify members of the virtual group (e.g., all users that have been shared with the same file may be identified as members of the virtual group); individuals that visit a same website may included in the virtual group; individuals identified in a photo or video using facial recognition techniques, or by parsing metadata associated with the photo or video, may be included as members of the virtual group; individuals recognized, using speech recognition techniques, in a call (e.g., a conference call) or an audio/video recording may be included as members of the virtual group; or individuals included in a chat contact list (e.g., all individuals in the contact list or a subset of individuals in the contact list) may be included as members of the virtual group. Any combination of the examples described above may be used to identify members of a virtual group.

A sub-set of members of the virtual group may be identified that have something in common that may be related to goods/services for sale (block 520). The "something in common" may include any type of attribute, characteristic, or action that the users may have in common. In some implementations, a sufficient number of members of the virtual group that have something in common may be required to determine the sub-set of members (e.g., a large enough number of the sub-set of members have to have the "something in common"). The attributes, characteristics or actions that the users may have in common may include, but are not limited to, purchasing a same product or service, downloading a same music or video, rating a same music or video highly, donating money to a same benefit, having a similar browser history (e.g., similar history of visited web pages), having a similar TV show or channel watching history, engaging in similar activities (e.g., jogging in a same geographic area as indicated by GPS, shopping in a same store, driving a same route (e.g., to work)), being the same age (or in a same age group), being a same gender, being in a same or similar income group (e.g., having a same or similar cost-sensitivity), or being related to one another (e.g., family members, or living together).

As one specific example, two users of a group may have recently purchased a same product, such as a digital camera. As another example, a few members of a group may have purchased a same music compact disc (CD). The attributes, characteristics or actions that the users may have in common may be compiled by one or more mobile stations 105 or by server 110, and may be analyzed by the one or more mobile stations 105 or by server 110. To compile these attributes, characteristics or actions, mobile station 105 or server 110 may track the activity of a user. For example, mobile station 105 or server 110 may track the user's on-line purchases. Mobile station 105 or server 110 may analyze the compiled characteristics, attributes or actions of a user to identify if there are any goods and/or services for sale that may be related to those compiled characteristics, attributes or actions.

Figure 12:
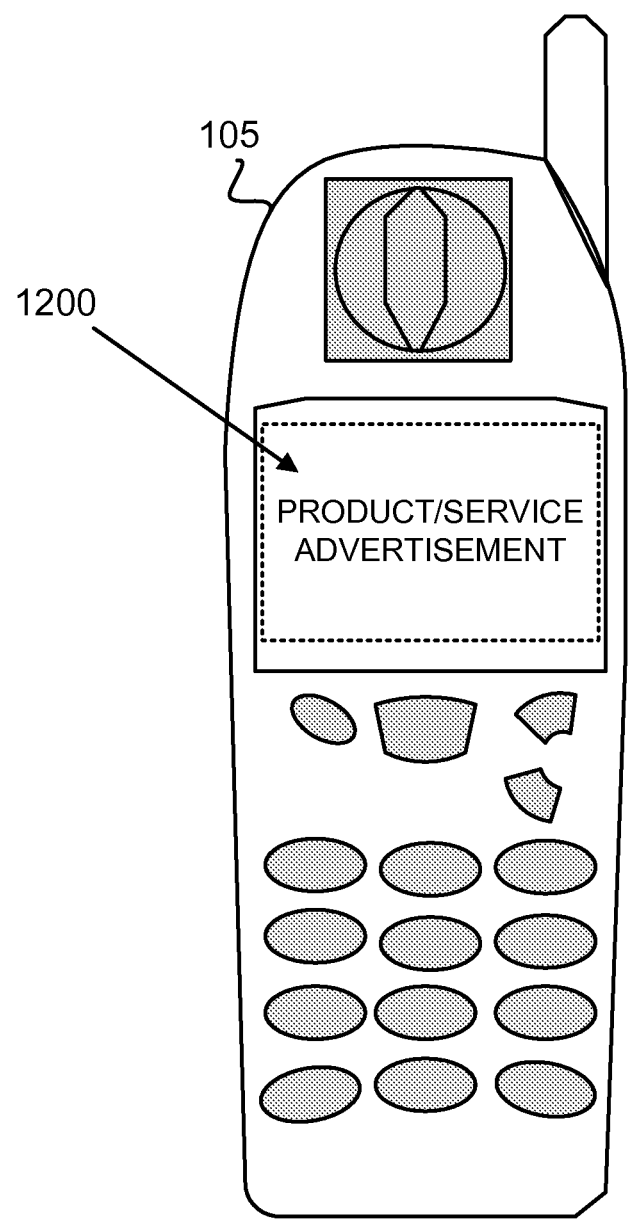
FIG. 12 illustrates the display of a product or service advertisement at a mobile station according to an exemplary implementation.

Advertisements related to the goods/services for sale may be targeted to other members of the virtual group not included in the sub-set of members (block 530). For example, advertisers may place advertisements with server 110, and server 110 may identify that the compiled characteristics, attributes or actions relate to one or more of the placed advertisements. In one implementation, each advertiser may associate one or more keywords with each advertisement. Server 110 may compare the compiled characteristics, attributes or actions to the one or more keywords to identify matches. The advertisements that correspond to the matches may be used as targeted advertisements that may be sent to other members of the virtual group that are not included in the sub-set of members identified in block 520. For example, if two members of a virtual group are identified as having purchased a digital camera, then an advertisement for a digital camera may be sent to mobile stations 105 associated with the other members of the virtual group. The targeted advertisements may be provided to mobile stations 105 associated with the members of the virtual group that are not included in the sub-set of members. For example, as illustrated in FIG. 12, a product and/or service advertisement 1200 may be provided to a mobile station 105 for visual display at mobile station 105. Advertisement 1200 may include a visual advertisement, as shown in FIG. 12. In other implementations, advertisement 1200 may include, as an alternative to or in addition to the visual advertisement, an audio advertisement that may be audibly presented to the user via mobile station 105. Other types of ways of presenting an advertisement may also be used. For example, presenting a certain smell to a user may be a form of advertisement.

In some implementations, the targeted advertisements may be sent by one mobile station (instead of server 110) to another mobile station. A first mobile station may be selected from one or more other mobile stations to send targeted advertisements to a second mobile station based on, for example, a trust relationship between the users of the first and second mobile stations, physical proximity between the first and second mobile stations, the first mobile station have a better connection (e.g., more bandwidth) than the one or more other mobile stations, the user of the first mobile station having a "closer" relationship or connection with the user of the second mobile station than the users of the one or more other mobile stations (e.g., both users work for the same company), or the user of the first mobile station has a closer connection in the virtual group than the users of the one or more other mobile stations.

Targeted advertisements may be distributed in a number of ways, including via email, short message service (SMS) or multimedia message service (MMS), via chat sessions, via Internet links (e.g., URLs), or via an updated Internet profile that specifies what advertisements to target to an individual when that individual logs in to a given service (e.g., logs into a web mail account, etc.). Targeted advertisements may be distributed to individuals via the individual's mobile station or personal computer or via the individual's television. For example, the targeted advertisements may be sent to an individual at that individual's mobile station. In another example, the targeted advertisements may be presented to an individual when that individual accesses the Internet. In a further example, the targeted advertisements may be presented to that individual via television commercials (since the individual's mobile station may be connected to the Internet and can share advertisement information to a television or home server).

In one implementation, advertisements may be identified as being non-suitable for members of the virtual group (e.g., gun advertisements for non-violent group members, meat for vegetarians, etc.), including members of the virtual group not included in the sub-set of members. Thus, targeting advertisements as described herein may include identifying a group of suitable ads and a group of non-suitable ads based on the attributes, characteristics or actions associated with the sub-set of members of the virtual group. In another implementation, attributes, characteristics or actions that the users may have in common may be combined in an excluding way (e.g., some including and some excluding). For example, a father and son may be hunters and may belong to a virtual group together with their hunter friends. Everyone in the virtual group may be subscribing to "Hunter's Weekly," except the son because the father already receives a subscription at their home. Therefore, the son should not receive ads about subscribing to "Hunter's Weekly" even though he belongs to the virtual group (e.g., "hunters" and "same address"=no subscription ad). However, the father and son should both receive ads about hunting clothes (e.g., "hunters"=new hunting clothes ads).

The foregoing description of implementations provides illustration and description, but is not intended to be exhaustive or to limit the implementations to the precise form disclosed. Modifications and variations are possible in light of the above teachings, or may be acquired from practice of implementations described herein. For example, while a series of blocks has been described with regard to FIG. 5 the order of the blocks may be modified in other implementations. Further, non-dependent acts may be performed in parallel. While exemplary embodiments have been described with respect to mobile devices (e.g., mobile stations), the exemplary embodiments described herein may also be applied to non-mobile devices (e.g., personal computers and other similar devices). In a Digital Living Network Alliance (DLNA) environment, the exemplary embodiments described herein may be applied to wired, wireless, mobile and/or non-mobile devices that may be connected together in an interoperable network. In additional embodiments, the exemplary process of FIG. 5 may instead include 1) identifying a set of people that have something in common that may be related to goods/services for sale; 2) determining a large enough sub-set of the set of people that have something in common; and 3) targeting advertisements to people in the set of people not included in the sub-set.

It will be apparent that aspects, as described above, may be implemented in many different forms of software, firmware, and hardware in the implementations illustrated in the figures. The actual software code or specialized control hardware used to implement aspects described herein is not limiting of the invention. Thus, the operation and behavior of the aspects have been described without reference to the specific software code, it being understood that software and control hardware may be designed to implement the aspects based on the description herein.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method, comprising:
    analyzing, using a processing unit, interactions between a plurality of device users;
    identifying, using the processing unit, selected device users, of the plurality of device users, as members of a virtual group based on the analyzing,
        where identifying the selected device users as members of the virtual group includes:
            identifying a call being placed between a first one of the plurality of device users and one or more second ones of the plurality of device users, and
            identifying the selected device users based on the call, the selected device users including the first one of the plurality of device users and the one or more second ones of the plurality of device users;
    identifying, using the processing unit, one or more attributes, characteristics, or actions, that a sub-set of the members of the virtual group have in common, that relate to one or more goods or services, for sale;
    targeting, using the processing unit, one or more advertisements, related to the one or more goods or services, for sale, to devices associated with other members of the virtual group that are not included in the sub-set of the members based on the one or more identified attributes, characteristics, or actions; and
    sending, using the processing unit, the targeted advertisements, related to the one or more goods or services, for sale, to devices associated with other members of the virtual group that are not included in the sub-set of the members based on the targeting.

2. The method of claim 1, where the users use mobile devices.

3. The method of claim 1, where the actions include a purchase made by one of the sub-set of the members of the virtual group that is similar to at least one other purchase made by at least one other of the sub-set of the members of the virtual group.

4. The method of claim 1, where identifying the selected device users as members of the virtual group further includes:
    obtaining an email list from an email address book stored at a device associated with one of the selected device users; and
    identifying the selected device users as members of the virtual group based on the email list.

5. The method of claim 1, where identifying the selected device users as members of the virtual group further includes:
    identifying an email being sent between a first one of the plurality of device users and other ones of the plurality of device users; and
    identifying the selected device users based on the email.

6. The method of claim 1, where identifying the selected device users as members of the virtual group further includes:
    identifying an instant message being sent between a first one of the plurality of device users and other ones of the plurality of device users; and
    identifying the selected device users based on the instant message.

7. The method of claim 1, where identifying the selected device users as members of the virtual group further includes:
    identifying when a first device associated with a first one of the plurality of device users is located within a same geographic vicinity as one or more second devices associated with one or more other ones of the plurality of device users; and
    identifying the selected device users based on the first device being located within a same geographic vicinity as the one or more second devices.

8. The method of claim 1, where identifying the selected device users as members of the virtual group further includes:
    identifying a short messaging service (SMS) message or a multimedia messaging service (MMS) message being sent between a first one of the plurality of device users and one or more other ones of the plurality of device users; and
    identifying the selected device users based on the message.

9. The method of claim 1, where identifying the selected device users as members of the virtual group further includes:
    identifying a first one of the selected device users using a network chat service to communicate with one or more second ones of the selected device users; and
    identifying the selected device users based on the first one of the selected device users using the network chat service to communicate with one or more second ones of the selected device users.

10. The method of claim 1, where the attributes, characteristics, or actions that the sub-set of the members have in common include at least one of purchasing a same product or service, downloading a same music or video, sharing files among one or more of the sub-set of members, rating a same music or video highly, donating money to a same benefit, having a similar browser history, having a similar television show or channel watching history, being in a same geographic location, traversing a same geographic area, shopping in a same store, driving a same route, being a same age, being a same gender, being in a same or similar income group, or being related to one another by family.

11. A method, comprising:
    selecting, using a processing unit, a plurality of first mobile device users as targets of advertisements based on one or more actions of a second mobile device user,
        where the second mobile device user is different than the selected first mobile device users, and
        where the one or more actions of the second mobile device user include at least one of:
            bringing a mobile device associated with the second mobile device user to a same geographic location as a plurality of mobile devices associated with the plurality of first mobile device users, within a given time period, or
            placing one or more calls to the plurality of mobile devices associated with the plurality of first mobile device users;
    analyzing, using the processing unit, one or more of attributes, characteristics, or actions that the first mobile device users and the second mobile device user have in common;
    identifying, using the processing unit, a plurality of goods or services, for sale, that are related to the analyzed attributes, characteristics, or actions, based on the analyzing; and
    sending, using the processing unit, one or more advertisements, related to the identified plurality of goods or services, for sale, to one or more of the plurality of mobile devices associated with the first mobile device users.

12. The method of claim 11, where a server sends the one or more advertisements to the one or more mobile devices associated with the first mobile device users via a network.

13. The method of claim 11, where the actions of the second mobile device user further include sending one or more emails to the first mobile device users.

14. The method of claim 11, where the actions of the second mobile device user further include sending one or more instant messages to the first mobile device users.

15. The method of claim 11, where the actions of the second mobile device user further include sending short messaging service (SMS) messages or multimedia messaging service (MMS) messages to at least one of the first mobile device users.

16. The method of claim 11, where the actions of the second mobile device user further include using a network chat service to communicate with one or more of the first mobile device users.

17. The method of claim 11, where the advertisements comprise visual advertisements, and where the one or more mobile devices associated with the first mobile device users display the visual advertisements.

18. The method of claim 11, where the advertisements comprise audio advertisements, and where the mobile devices associated with the first mobile device users audibly present the audio advertisements.

19. A system, comprising:
   an interface to:
      receive data related to actions of a plurality of mobile device users,
      receive a plurality of advertisements, from one or more advertisers, related to goods or services for sale; and
   a processing unit to:
      identify selected mobile device users, of the plurality of mobile device users, as members of a virtual group based on the actions,
         where the actions include placing one or more calls between at least one of the plurality of mobile device users and at least another one of the plurality of mobile device users, and
         where the identified selected mobile device users include the at least one of the plurality of mobile device users and the at least another one of the plurality of mobile device users,
      identify attributes, characteristics, or actions, that a sub-set of the members of the virtual group have in common, that relate to one or more of the plurality of advertisements,
      where the interface is further to send the one or more of the plurality of advertisements related to the goods or services to mobile devices associated with other members of the group not included in the sub-set of members.

20. The system of claim 19, where the actions further include sending one or more emails between at least one of the plurality of mobile device users and at least another one of the plurality of mobile device users.

21. The system of claim 19, where the actions further include sending one or more instant messages between at least one of the plurality of mobile device users and at least another one of the plurality of mobile device users.

22. The system of claim 19, where the actions further include bringing a mobile device associated with one of the plurality of mobile device users to a same geographic location as one or more mobile devices associated with other ones of the plurality of mobile device users within a given time period.

23. The system of claim 19, where the actions further include sending one or more short messaging service (SMS) messages or multimedia messaging service (MMS) messages between at least one of the plurality of mobile device users and at least another one of the plurality of mobile device users.

24. The system of claim 19, where the actions further include using a network chat service to communicate between at least one of the plurality of mobile device users and at least another one of the plurality of mobile device users.

25. A system, comprising:
   means for identifying selected device users of a plurality of device users, as members of a virtual group,
      where the means for identifying the selected device users includes:
      means for identifying a first one of the plurality of device users and one or more second ones of the plurality of device users based a telephone call placed between the first one of the plurality of device users and the one or more second ones of the plurality of device users, and at least one of:
      means for identifying one or more of the plurality of device users in image data or video data, or
      means for identifying one or more of the plurality of device users included in a calendar application,
      where the selected device users include the identified devices users, and
      where at least one of the member of the virtual group is a target for one or more advertisements related to goods or services, for sale;
   means for identifying attributes, characteristics, or actions that a sub-set of members of the virtual group may have in common that may be related to a plurality of goods or services for sale; and
   means for sending advertisements related to the plurality of goods or services to devices associated with other members of the group not included in the sub-set of members.

26. The system of claim 25, where the means for identifying the selected device users further includes:
   means for identifying, using speech recognition, other one or more of the plurality of device users in another call or a multimedia file, where the selected device users include the identified other one or more of the plurality of device users.

* * * * *